Figure 1:
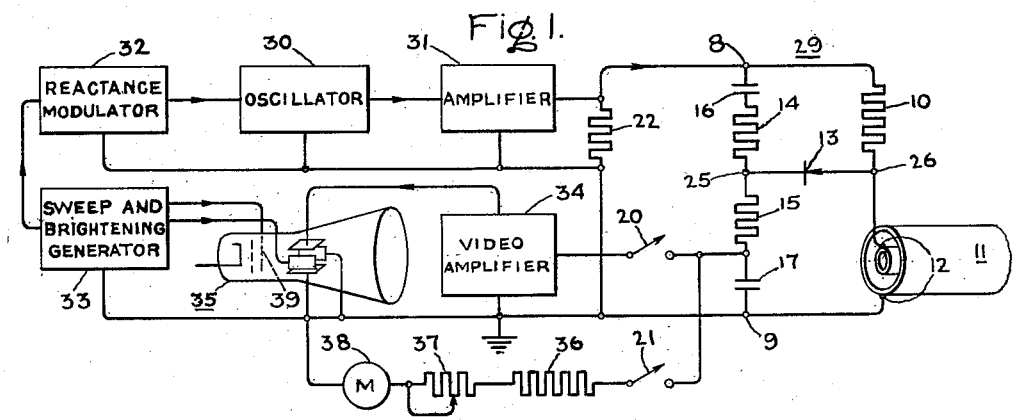

Oct. 30, 1951  J. K. CHAPMAN  2,573,402
BANDWIDTH INDICATOR
Filed Oct. 12, 1948

Inventor:
James K. Chapman,
by Merton D. Moore
His Attorney.

Patented Oct. 30, 1951

2,573,402

UNITED STATES PATENT OFFICE 2,573,402

BAND WIDTH INDICATOR

James K. Chapman, Syracuse, N. Y., assignor to General Electric Company, a corporation of New York Application October 12, 1948, Serial No. 54,101

8 Claims. (Cl. 175—183)

1

This invention relates generally to impedance measuring devices and more particularly to measuring devices utilizing a variable frequency oscillator and a cathode ray tube indicator to give a visual indication of the variation in impedance of a network over a band of frequencies.

This invention finds particular application in the regulating of complicated electrical networks which require multiple adjustments for tuning to an operating frequency and for keeping the frequency response uniform over a desired band. With such networks, it is not always necessary to attain an absolute determination of the impedance at all frequencies over the response band. Quite often all that is required is an accurate determination of the impedance at a central frequency and a relative determination over a band of frequencies extending on either side.

It is an object of my invention to provide a new and improved circuit for giving an indication of the impedance of a network at the center of a band of frequencies and, also an indication of the impedance over a range of frequencies on either side of this center frequency.

Another object of my invention is to provide an improved circuit for providing a single presentation of the characteristics of a network over a band of frequencies.

Another object of my invention is to provide an improved circuit for giving accurate determination of the standing wave ratio in a transmission line at a center frequency, and a comparative indication by visual means of the standing wave ratio for frequencies on either side of this center frequency.

A further object of my invention is to provide an improved circuit which will simultaneously give a reasonably accurate determination of the impedance of a network at one particular frequency, and a visual indication of the variation in impedance of this network over a band of frequencies.

For additional objects and advantages and for a better understanding of the invention, attention is now directed to the following description and accompanying drawings, and also to the appended claims in which the features of the invention believed to be novel are particularly pointed out.

In carrying out my invention, I make use of a bridge comprising four impedances, three of which are of known magnitude and a fourth of which is constituted by the network whose impedance is to be determined. The bridge is supplied with alternating voltage, of the intended frequency of operation, from an oscillator whose frequency is varied by means of a reactance modulator. Instead of providing an adjustable arm to balance the bridge, as is usually done with bridge measuring devices, I provide a detection circuit and leave the bridge unbalanced. The output of the detection circuit is utilized to provide an indication. For example, the output may be indicated on a meter and also utilized to cause a deflection in a cathode ray tube indicator. In such case, I also provide a sweep and brightening generator for the cathode ray indicator, to permit horizontal deflection of the beam in synchronism with a variation in frequency caused in the oscillator by the reactance modulator. In addition, according to a preferred form of my invention, I provide means for causing the frequency sweep of the oscillator to have a very short duty cycle, so that it is possible to operate the cathode ray indicator simultaneously with the meter and to permit a reasonable order of accuracy in both indications.

Figure 2:
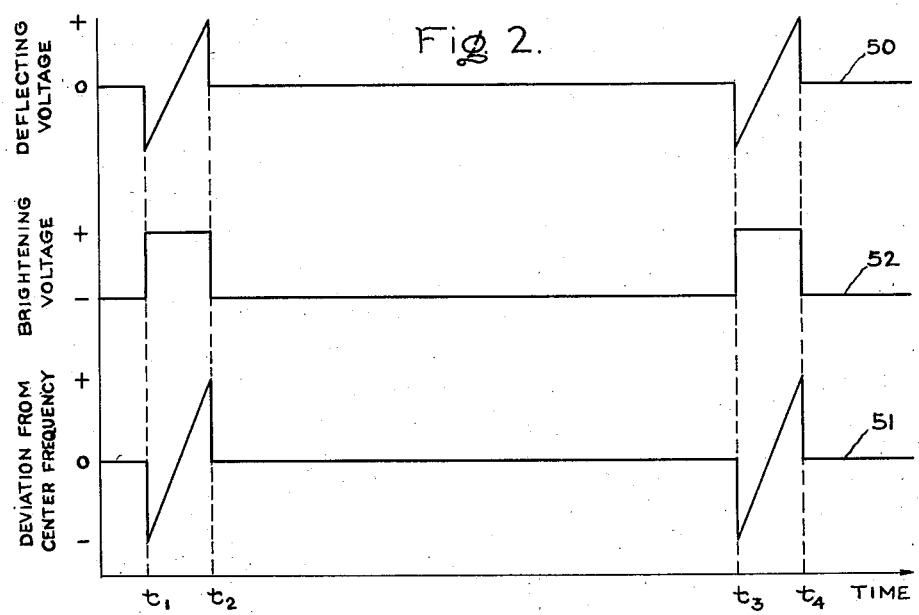
Figure 3:
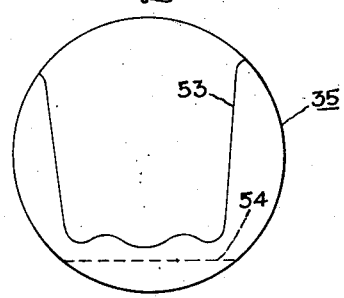

In the drawings, Fig. 1 is a simplified schematic illustration of a circuit embodying my invention; Fig. 2 shows a number of curves illustrating the operation of the circuit of Fig. 1; and Fig. 3 shows a typical impedance-frequency curve of the visual indicator of Fig. 1.

Referring to Fig. 1, there is shown a bridge 29 comprising two arms connected in parallel between a pair of input points 8 and 9. One arm consists of equal capacitances 16 and 17 and equal resistances 14 and 15, serially connected and symmetrically disposed on either side of a conjugate point 25, so that this point is always maintained at mid-potential with respect to the input points. The other arm consists of a resistance 10 and a pair of terminals 12 for the connection of an unknown impedance 11, the junction of resistance 10 and one of the terminals constituting the other conjugate point 26. A suitable rectifying device, represented as a crystal 13, is connected between point 25 of the first arm and point 26 of the second arm. A resistor 22 is connected in parallel with both arms for the purpose of preventing any variation in the magnitude of the unknown impedance 11 from affecting the voltage applied to the network at the input terminals. The measuring current is taken from the network at the junction of resistor 15 and capacitor 17 and flows back to ground through either the meter 38, or the input to the video amplifier 34, depending on the position of the switches 20 and 21.

Operating potential at the frequency at which a determination of the impedance of the unknown circuit is desired, is supplied by an amplifier 31 which is driven by an oscillator 30.

A meter 38 in series with a potentiometer 37 and a resistor 36 may be connected to the detection circuit by means of the switch 21. The purpose of the meter is to provide an accurate determination of the impedance of the circuit 11 at one specified frequency to which the oscillator 30 is adjusted. A cathode ray tube 35 is utilized for the purpose of providing a visual indication of the variation in impedance of the unknown circuit over a band of frequencies. A video amplifier 34 may be connected to the detection circuit by means of a switch 20 for the purpose of amplifying the measuring current and supplying a voltage proportional to it, to the vertical deflection plates of the cathode ray tube. A sweep and brightening generator 33 supplies deflecting voltages to the horizontal deflecting plates of the cathode ray tube, and also brightening pulses to a brightness control electrode 39, in well-known manner. A reactance modulator 32 is used to vary the frequency of the oscillator 30 and is in turn controlled by an input from the sweep and brightening generator 33. The units 30–35, inclusive, may be of various suitable forms known to the art, and are therefore shown only in simplified block forms.

The effective operation of the bridge is dependent upon maintaining point 25 at a mid-potential with respect to the alternating voltage supplied to the input points. For this purpose, resistances 14 and 15 are chosen to have equal values. Capacitances 16 and 17 are also selected to have equal values and low reactances at the frequency of operation of the bridge. The purpose of capacitors 16 and 17 is essentially to block the flow of direct current through this arm of the bridge. Resistor 10 provides a comparison standard in relation to which the impedance of the unknown circuit is determined.

The purpose of the rectifier 13 is to detect the alternating potential existing between points 25 and 26 during an impedance measurement and to produce a unidirectional current proportional to this voltage. Because capacitor 17 prevents the flow of unidirectional current to ground, this current will flow through either the meter 38 or the input of the video amplifier 34, or both simultaneously, depending upon the positions of the switches 20 and 21. The return path is provided by the unknown circuit 11 in parallel with the series combination of the known resistors 10 and 22. In case it should be desired to measure an unknown circuit which does not possess a continuous unidirectional current path, the series combination of resistors 10 and 22 will provide the return path.

A consideration of the network will show that the voltage developed between points 25 and 26 is zero when the impedance of the unknown circuit connected across terminals 12 is exactly equal to that of resistor 10. Under any other conditions, a voltage will be developed across the rectifier. When either an open circuit or a short circuit is connected across the test terminals 12, this voltage will attain a maximum value equal to half the magnitude of the voltage applied to the input points. For any other value of impedance connected across the test terminals, a voltage will exist, and the rectifier will produce a current causing a deflection of the meter intermediate between the zero deflection and the maximum deflection. The meter can be calibrated to read impedances directly by taking a series of measurements with known resistances connected across the test terminals.

A more elegant way of calibrating the meter consists of making a number of tests and interpolating between the results thus obtained by means of the mathematical Equation V which will now be derived. In this derivation, the symbols have the following significance:

$Z_c$=impedance in ohms of resistor 10.
$Z_x$=impedance in ohms of circuit 11.
$E$=alternating voltage applied to the input points 8 and 9.
$I$=current flowing through $Z_c$ and $Z_x$ in series.
$e$=alternating voltage developed between the conjugate points 25 and 26.

Assuming a short circuit between the test terminals 12, and the following relations:

$$Z_x = 0,\ I = I_0\ \text{and}\ e = e_0$$

Since the applied voltage $E$ is developed across $Z_c$ and the voltage existing at point 25 is $E/2$, it follows that:

$$e_0 = \frac{E}{2} \quad (I)$$

Assuming now the impedance of the circuit 11 to be unknown, and the following relations:

$$Z_x = Z_x,\ I = I_x\ \text{and}\ e = e_x$$

Applying Kirchhoff's law, it follows that:

$$Z_x \cdot I_x = \frac{E}{2} + e_x \quad (II)$$

and $$Z_c \cdot I_x = \frac{E}{2} - e_x \quad (III)$$

Dividing Equation II by Equation III:

$$\frac{Z_x}{Z_c} = \frac{\frac{E}{2} + e_x}{\frac{E}{2} - e_x} \quad (IV)$$

Substituting in IV the value of $E/2$ in Equation I:

$$\frac{Z_x}{Z_c} = \frac{e_0 + e_x}{e_0 - e_x} \quad (V)$$

The actual mathematical relationship governing the deflection of the meter 38 may be modified by the detection characteristic of the rectifier 13. If rectifier 13 is a linear detector, the relationship will be as follows:

$$\frac{Z_x}{Z_c} = \frac{d_0 + d_x}{d_0 - d_x} \quad (VI)$$

where $d_0$ is the deflection of the meter when a short circuit is connected across terminals 12, and $d_x$ is the deflection with the unknown circuit connected.

If the rectifier 13 is a square-law detector, or follows a law of detection to the $n$th power, a similar equation can readily be derived. A separate calibration for the voltage standing wave ratio is not required. To determine the standing wave ratio in the circuit 11, all that is necessary is to choose resistor 10 so that it has a magnitude equal to the characteristic impedance of the circuit 11. For instance, if the circuit 11 comprises a transmission line having a characteristic impedance of 50 ohms, resistor 10 is chosen to have a resistance of 50 ohms at the frequency of operation. Then, since the voltage standing wave ratio, SWR, is equal to the ratio $Z_x/Z_c$, it follows that the meter, being already calibrated to read the ratio $Z_x/Z_c$, will read SWR.

If desired, the impedance of the network 11 may be determined at one frequency by setting the oscillator 30 to the required frequency and placing the meter 38 in the circuit by means of the switch 21. Thereafter, the variation in impedance over the band of frequencies on either side of the chosen frequency may be determined by turning on the sweep and brightening generator 33 and the reactance modulator 32, and by connecting the video amplifier 34 into the detection circuit by means of the switch 20. The circuit will operate with any kind of a sweep voltage applied to the horizontal deflecting plates of the cathode ray tube 39, provided that the frequency of the oscillator 30 is caused to vary proportionally by the reactance modulator 32. However, if the frequency of the oscillator is shifted continuously, the indication of the meter M will be proportional to the impedance of the circuit 11 averaged over the band. Accordingly, the indication of the meter is liable to be considerably in error.

In accordance with a modification of my invention, I apply, to the horizontal deflecting plates, a sweep voltage, having a very short duty cycle, as illustrated by curve 50 of Fig. 2. Simultaneously, the reactance modulator 32 causes the frequency of operation of the oscillator 30 to shift in accordance with curve 51. For instance, I cause the frequency to shift through the complete band during the interval from time $t_1$ to time $t_2$ and to remain at the center frequency, before and after this interval. At time $t_3$, the frequency shift repeats itself in a similar fashion. If the interval $t_1-t_2$ is made very short with respect to the interval $t_2-t_3$, that is, if the duty cycle is made very short, the frequency of operation of the oscillator 30 will be at the center frequency almost continuously. Under these circumstances, the meter will indicate the true impedance of the unknown circuit at the center frequency with only a very small error. This error can be reduced to the point where it is practically immaterial by shortening the duty cycle of the sweep generator. For instance, if the duty cycle of the sweep generator is 1%, that is, if the ratio of the time interval $t_1-t_2$ to the time interval $t_1-t_3$ is 1:100, then the maximum possible error in the indication of the meter will be 1% no matter how large the deviation in impedance of the unknown circuit is on either side of the center frequency. To provide sufficient brightness on the face of the cathode ray tube when such a short duty cycle is used, a positive pulse is supplied to the brightening electrode 39 during the time interval $t_1-t_2$, as illustrated by curve 52 of Fig. 2.

Fig. 3 illustrates a typical impedance curve 53 on the face of the cathode ray tube for a multisection band pass filter. It is possible to calibrate the face of the tube, and exactly the same mathematical relationship would apply as does in the calibration of the meter. When the cathode ray indicator is to be used as a measuring instrument rather than as a simple comparison device, the video amplifier 34 will include a direct-current restorer to permit referring any indication to the same base line.

By way of illustration only and not by way of limiting this application thereto, the following component values have been found to give efficient operation in a particular construction of this impedance measuring device:

| Resistance | Ohms | Capacitances | Micromicrofarad | Directional | Type |
| --- | --- | --- | --- | --- | --- |
| 14 | 51 | 16 | 2,200 | 13 | 1N34 |
| 15 | 51 | 17 | 2,200 | | |
| 10 | 52 | | | | |
| 36 | 4,700 | | | Meter | Microammeter |
| 37 | 10,000 | | | | |
| | | | | 38 | 0-100 |

While a specific embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. In combination, an impedance measuring network having two parallel conducting paths, the junctions of said paths constituting a pair of input points to said network, one of said paths being composed of two equal groups of impedances, each group comprising an element which has an impedance substantially higher for alternating voltages than for unidirectional voltages, the other of said paths comprising a reference impedance and an unknown impedance, a pair of conjugate points constituted by the junction of said two groups and by the junction of said reference and said unknown impedance, a rectifier connected across the conjugate points of said network, an oscillator connected to the input terminals of said network, a cathode ray indicator comprising two sets of quadrature spaced deflection plates, a sweep voltage generator, said indicator having one set of deflecting plates connected across one of said elements, means for applying said sweep voltage to the other set of deflection plates, and means to vary the frequency of said oscillator synchronously with the sweep of said indicator, thereby to provide a visual indication of the variation of said unknown impedance with frequency.

2. In combination, an impedance measuring network having two parallel conducting paths, the junctions of said paths constituting the input points to said network, one of said paths being composed of two equal resistances and two capacitances serially connected, the junction of said resistances providing a first conjugate point, said capacitances connecting said resistances to the input points, the other of said paths comprising a reference impedance and an unknown impedance, the junction of said reference and unknown impedances constituting a second conjugate point, a rectifier connected between said conjugate points, a meter connected across one of said capacitances and calibrated in terms of the ratio of said impedances, an oscillator connected to the input terminals of said network, a cathode ray indicator provided with a sweep generator, said indicator having a set of deflecting plates connected in parallel with said meter and means to vary the frequency of said oscillator synchronously with the sweep of said indicator, thereby to provide a visual indicator of the variation of said ratio with frequency.

3. In combination, an impedance measuring network having two parallel conducting paths, the junctions of said paths constituting the input points to said network, an oscillator supplying an output at a central frequency to said input points, one of said paths comprising two equal resistances and two equal capacitances serially connected, each of said capacitances being connected to one of the input points and the junction of said resistances constituting a first conjugate point, the other of said paths comprising a reference resistance and a circuit network, whose junction provides a second conjugate point, said reference resistance having a value equal to the characteristic impedance of said network, a rectifier connected across said conjugate points, a cathode ray indicator connected in parallel with the capacitance adjacent to said network, a sweep generator for providing a horizontal deflection in said cathode ray indicator, and a reactance modulator having an input connected to said sweep generator and an output connected to said oscillator, thereby to vary the frequency of said oscillator synchronously with the sweep of said indicator.

4. In combination, an impedance measuring network having two parallel conducting paths, the junctions of said paths constituting the input points to said network, an oscillator supplying an output at a central frequency to said input points, one of said paths comprising two equal resistances and two equal capacitances serially connected, each of said capacitances being connected to one of the input points and the junction of said resistances constituting a first conjugate point, the other of said paths comprising a reference impedance and an unknown impedance whose junction provides a second conjugate point, a rectifier connected across said conjugate points, a meter and a cathode ray indicator connected in parallel with the capacitance adjacent to said unknown impedance, a sweep generator for providing a horizontal deflection in said cathode ray indicator, and a reactance modulator having an input connected to said sweep generator and an output connected to said oscillator, thereby to vary the frequency of said oscillator synchronously with the sweep of said indicator, said sweep generator providing sweep voltages to said reactance modulator and to said indicator during an interval of time which is short relative to the interval between successive sweep voltages, whereby said meter indicates substantially the magnitude of said unknown impedance at said central frequency.

5. An arrangement for simultaneously determining the frequency response of a load circuit over a band of frequencies and at the mean frequency of said band comprising an impedance measuring bridge of the null type, said bridge comprising input and output terminals, one arm of said bridge comprising said load circuit, a cathode ray tube comprising two sets of deflection elements, a source of oscillations coupled to said input terminals, means for sweeping the frequency of said source of oscillations over a given band, means for producing a sweep voltage in synchronism with said sweeping means, means for applying said sweep voltage across one set of deflection elements, means for coupling said output terminals to the other set of deflection elements and means coupled to said output terminals and responsive substantially only to the mean frequency output of said bridge for indicating the frequency response of said load circuit at said mean frequency.

6. An arrangement for displaying the variation in impedance of a load circuit with frequency comprising an impedance bridge, a source of oscillations, a cathode ray tube comprising two sets of deflection elements, said bridge comprising four arms serially connected in a closed loop, combined reactive and resistive elements comprising the first and second arms of said bridge, first and second arms being serially connected across said source, said load circuit and an impedance element, constituting the third and fourth arms of said bridge, being serially connected across said source, means for sweeping the frequency of said source of oscillations over a given band, a sweep signal source, said signal being synchronous with said frequency sweeping, means for applying said sweep signal to one set of said deflection elements, a rectifying element connecting the junction of said first and second arms with the junction of said third and fourth arms, and means for applying the rectified output developed across one of said reactive elements to the other of said deflection elements.

7. An arrangement for indicating the standing wave ratio of an electrical network over a band of frequencies comprising an impedance bridge, said bridge comprising four arms serially connected in a closed loop, a source of oscillations, combined reactive and resistance elements comprising the first and second arms of said bridge, said first and second arms being serially connected across said source, a resistance of substantially the same value as the characteristic impedance of said network and said network comprising the third and fourth arms of said bridge, means for sweeping the frequency of said source over a given band, means for producing a sweep voltage in synchronism with said sweeping means, a cathode ray tube comprising two sets of deflection elements, means for applying said sweep voltage across one set of deflection elements, a rectifying element connecting the junction of said first and second arms with the junction of said third and fourth arms, and means for applying the rectified output of said rectifying means developed across one of said reactive elements to the other set of said deflection elements.

8. An arrangement for simultaneously displaying the frequency response of a load circuit over a band of frequencies and at the mean frequency of said band comprising an impedance bridge, said bridge comprising input and output terminals, one arm of said bridge comprising said load circuit, a cathode ray tube comprising two sets of deflection elements, a source of oscillations coupled to said input terminals, means for sweeping the frequency of said source over a given band, means for producing a sweep signal synchronous with said sweeping means, said sweeping means comprising a circuit alternately sweeping the frequency of said source over said range during a given time interval and maintaining the frequency of said source at said mean frequency during an interval substantially larger than said given interval, means for applying said sweep signal to one set of said deflection elements, means for coupling said output terminals to the other set of deflection elements, and means coupled to said output terminals and responsive substantially only to the mean frequency output of said bridge.

JAMES K. CHAPMAN.

REFERENCES CITED

The following references are of record in the file of this patent:

UNITED STATES PATENTS

| Number | Name | Date |
| --- | --- | --- |
| 2,178,471 | De Bruin | Oct. 31, 1939 |
| 2,297,393 | Deserno | Sept. 29, 1942 |
| 2,356,510 | Deserno | Aug. 22, 1944 |